US006808755B2

(12) United States Patent
Miyamoto et al.

(10) Patent No.: US 6,808,755 B2
(45) Date of Patent: Oct. 26, 2004

(54) THERMAL SPRAYING METHOD AND APPARATUS FOR IMPROVED ADHESION STRENGTH

(75) Inventors: Noritaka Miyamoto, Toyota (JP); Kouta Kodama, Toyota (JP); Ikuo Marumoto, Anjyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/404,539

(22) Filed: Apr. 2, 2003

(65) Prior Publication Data

US 2003/0185995 A1 Oct. 2, 2003

Related U.S. Application Data

(63) Continuation of application No. 09/678,027, filed on Oct. 3, 2000, now abandoned.

(30) Foreign Application Priority Data

Oct. 20, 1999 (JP) ............................................ 11-298415

(51) Int. Cl.[7] ................................................ C23C 4/12
(52) U.S. Cl. ...................... 427/446; 427/453; 427/455; 427/456
(58) Field of Search ................................ 427/446, 453, 427/455, 456; 239/79

(56) References Cited

U.S. PATENT DOCUMENTS

| 2,101,922 | A | * | 12/1937 | Stoesling |
| 4,065,057 | A | * | 12/1977 | Durmann |
| 4,634,611 | A | | 1/1987 | Browning |
| 4,964,569 | A | * | 10/1990 | Stevens |
| 5,117,482 | A | * | 5/1992 | Hauber |
| 5,302,414 | A | | 4/1994 | Alkhimov et al. |
| 5,445,324 | A | * | 8/1995 | Berry et al. |
| 5,503,872 | A | * | 4/1996 | MacKenzie et al. |
| 5,529,809 | A | * | 6/1996 | Glovan et al. |
| 5,938,944 | A | | 8/1999 | Baughman et al. |
| 6,402,050 | B1 | * | 6/2002 | Kashirin et al. |

FOREIGN PATENT DOCUMENTS

| DE | 19756594 A1 | 6/1999 |
| DE | 19812441 A1 | 9/1999 |
| EP | 0 157 407 A2 | 10/1985 |
| JP | B2-61-45494 | 10/1986 |
| JP | A-61-230760 | 10/1986 |
| JP | B2-63-66900 | 12/1988 |
| JP | A-1-313896 | 12/1989 |
| JP | A-3-61353 | 3/1991 |
| JP | B2-4-50381 | 8/1992 |
| JP | B2-5-5893 | 1/1993 |
| JP | B2-6-21335 | 3/1994 |
| JP | A-06-299315 | 10/1994 |

OTHER PUBLICATIONS

Thermal Spraying: Practice, Theory and Applicaton, American Welding Society, Inc. 1985, pp. 9–11.*
Cold Gas–Dynamic Spray Method, FutureTech, No. 224, Aug. 1998, pp. 2–15.
R. C. Dykhuizen et al., Gass Dynamic Principles of Cold Spray, Journal of Thermal Spray Technology, vol. 7, Jun. 1998, pp. 205–212.

* cited by examiner

Primary Examiner—Katherine A. Bareford
(74) Attorney, Agent, or Firm—Oliff & Berridge, PLC

(57) ABSTRACT

A thermal spraying method includes the steps of: (1) preparing a speed-increasing means for adding energy to the heated material or the heating material to increase a flying speed of the material; and (2) adding energy to the heated material or the heating material by the speed-increasing means in such a manner that a flying speed of the heated material or the heating material increases until the material reaches a surface of an object.

11 Claims, 9 Drawing Sheets

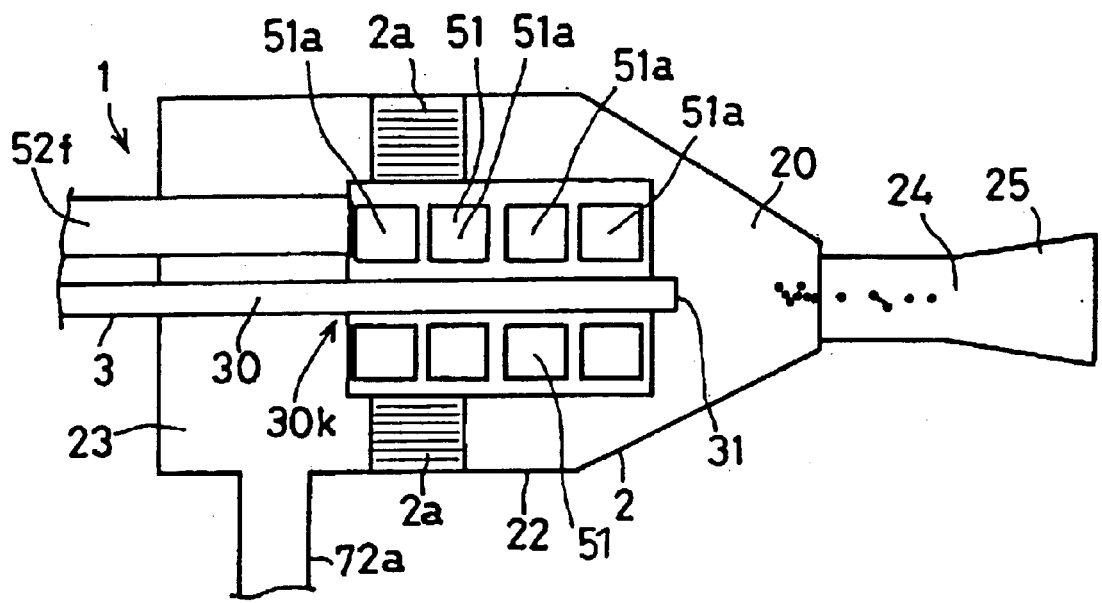
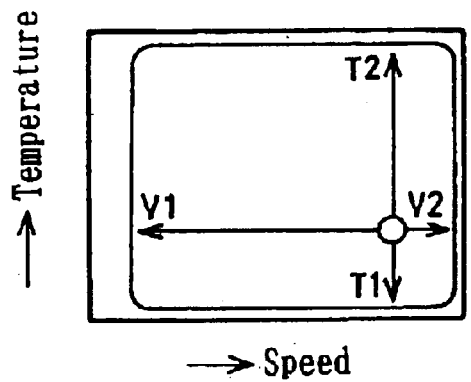
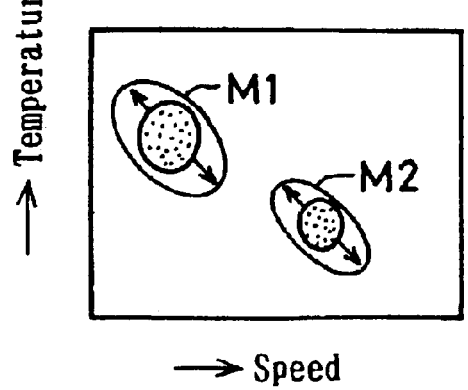

THERMAL SPRAYING METHOD AND APPARATUS FOR IMPROVED ADHESION STRENGTH

This is a Continuation of application Ser. No. 09/678,027, filed Oct. 3, 2000, now abandoned.

TECHNICAL FIELD

The present invention relates to a thermal spraying method for increasing adhesion strength of the thermal sprayed layer. The present invention relates to a thermal spraying apparatus and a powder passage apparatus which can be used in the thermal spraying method.

BACKGROUND ART

There has been developed a thermal spraying method for forming thermal sprayed layer in the industrial world. In the thermal spraying method, material having a powder shape is heated in high temperatures, the heated material is sprayed and is piled up on a surface of an object by thermal spraying. The thermal spraying advantageously increases abrasion resistance and corrosion resistance of the object by the thermal sprayed layer. Also, Japanese Unexamined Patent Publications 63-66900 and 5-5893 disclose a thermal spraying method which uses: an energy source for flying material; and another energy source for heating the material by a laser beam and being independent of the energy source. According to this Publication techniques, the material for thermal spraying flys to the object, and the flying material is heated by the laser beam running parallel with the surface of the object.

In the conventional thermal spraying method, the heated material for thermal spraying decreases in flying speed as it approaches the object. Also, in the thermal spraying method concerning the above-mentioned Publications, the heated material for thermal spraying decreases in flying speed as it approaches the object. Therefore, the thermal spraying layer is not much improved in adhesion strength, even when other spraying conditions are improved.

SUMMARY OF THE INVENTION

The present invention has been accomplished in view of the aforementioned circumstances. It is therefore an aim of the present invention to provide a thermal spraying method for improving adhesion strength of a thermal sprayed layer. It is therefore another aim of the present invention to provide a thermal spraying apparatus for using the present invention method and for improving adhesion strength of a thermal sprayed layer. Also, it is therefore still another aim of the present invention to provide a powder passage apparatus which can be used in carrying out the present invention method and can suppress powder material from being stopped in a passage.

According to a first aspect of the present invention, a thermal spraying method for producing a thermal sprayed layer by heating material for thermal spraying, by flying the heated material or the heating material to a surface of an object, and by piling the heated material on the surface of the object, comprises the steps of:

(1) preparing a speed-increasing means for adding energy to the heated material or the heating material to increase a flying speed of the material; and (2) adding energy to the heated material or the heating material by the speed-increasing means in such a manner that a flying speed of the heated material or the heating material increases until the material reaches the surface of the object.

According to a second aspect of the present invention, a thermal spraying apparatus for producing a thermal sprayed layer by heating material for thermal spraying, by flying the heated material or the heating material to a surface of an object, and by piling the heated material on the surface of the object, comprises:

(1) a passage-forming member for forming a passage through which material for thermal spraying passes;

(2) a heating means for heating the material passing through the passage-forming member or discharged from the passage-forming member; and (3) a speed-increasing means for increasing a flying speed of heated material.

According to a third aspect of the present invention, a powder passage apparatus comprises:

(1) a conductive coil having conductivity, and having an axis and a plurality of loops disposed substantially coaxially with respect to the axis; and (2) a passage-forming member disposed along the axis of the conductive coil for supplying material for thermal spraying.

According to the first aspect of the present invention, until the heated material reaches the surface of the object, energy is added to the heated material or the heating material by the speed-increasing means in such a manner that a flying speed of the heated material increases. Accordingly, the material for thermal spraying collides against the object at a high speed. So, the thermal sprayed layer is improved in adhesion strength.

Also, in a preferable mode, the flying speed of the material is increased in comparison with that of heating position. In other words, in a preferable mode, the flying speed of the material at the heating position, namely, the flying speed before the acceleration, is lower than that of the material after the acceleration. This mode can lengthen the time for heating the material for thermal spraying, thereby enhancing ability for heating the material for thermal spraying to high temperatures.

According to the second aspect of the present invention, a thermal spraying apparatus comprises: (1) a passage-forming member for forming a passage through which material for thermal spraying passes; (2) a heating means for heating the material passing through the passage-forming member or discharged from the passage-forming member; and (3) a speed-increasing means for increasing a flying speed of material. So, the thermal spraying apparatus according to the second aspect can be used in carrying out the first aspect of the present invention, thermal spraying method. Accordingly, the material for thermal spraying collides against the object at a high speed, and the thermal sprayed layer is improved in adhesion strength. Preferably, the speed-increasing means increases the flying speed of the material than that of the material during heating.

According to the third aspect of the present invention, the powder passage apparatus comprises: a conductive coil, having conductivity, and having an axis and a plurality of loops disposed substantially coaxially with respect to the axis. Also, the passage-forming member is disposed along the axis of the conductive coil. So, the apparatus according to the third aspect can be used in heating the material for thermal spraying by means of induction heating. Induction heating is advantageous in heating the material for thermal spraying in a short time, and in controlling heating temperature.

Further, according to the third aspect of the present invention, when electricity is supplied to the conductive coil, it is suppressed that the material for thermal spraying adheres to the inner surface of the passage of the passage-forming member. The reason is as follows: The conductive coil generates magnetic force along the central axis line of the passage, namely, along the central axis line of the conductive coil. So, the powder material for thermal spraying, having permeability, easily flows along the center portion in a radial direction of the passage.

PREFERABLE MODE OF THE INVENTION

According to the first aspect of the present invention, until the heated material reaches the surface of the object, energy is added to the flying material by a speed-increasing means in such a manner that a flying speed of the material increases. When the flying speed of the material for thermal spraying is increased, the material collides against the object at a high speed, adhesion of the material is improved, and the thermal sprayed layer is improved in adhesion strength.

According to the preferable mode of this invention, the adding of the energy for increasing the flying speed of material is carried out after the heating of the material. That is to say, after the material for thermal spraying is heated, the flying speed of the material is increased. The heating before increasing the flying speed of the material can lengthen the time which is required for heating the material.

Or, according to the thermal spraying method for concerning another preferable mode of the first invention, the flying speed of the material can be increased during the heating of material. Also, the thermal spraying method concerning the first invention rarely allows the flying speed of the material to be increased before the heating of material.

The material for thermal spraying may be in a form of particle, when it flies to the object. The flying form of particle may be in a solid form, in a melting form, or in a partially melting form. The form of material before thermal spraying may be in a powder state, in a wire state, or in a rod state. When the form of material is powder, the average diameter of particle of the material is decided on occasion. The upper limit of average diameter of the particle may be for example 100 $\mu$m, 200 $\mu$m, 300 $\mu$m or 500 $\mu$m. The lower limit of average diameter of the particle is for example 1 $\mu$m, 10 $\mu$m or 40 $\mu$m. Therefore, the average diameter of particle of the material may be in a range of 1–500 $\mu$m, in a range of 10–300 $\mu$m, or in a range of 40–200 $\mu$m. The average diameter of particle is not limited within these.

The material for thermal spraying is preferably metal, especially metal powder. When the material for thermal spraying is metal, it has conductivity. Also, many metals have good magnetic permeability. The metal may have, in the ordinary temperature range, ferromagnetism or paramagnetism. Concretely, the metal constituting the material for thermal spraying may be ferrous such as cast iron, carbon steel, stainless steel, or alloy steel. Also, the metal constituting the material for thermal spraying may be non-ferrous—at least one selected from the group consisting of aluminum, aluminum alloy, copper, copper alloy, nickel, nickel alloy, titanium, or titanium alloy. Sometimes, the material for thermal spraying may be ceramics, cermet mixing ceramics with metal. Ceramics may be oxide, nitride, carbide or boride. Ceramics may be at least one selected from the group consisting of alumina, silica, magnesia, silicon carbide, silicon nitride, boride titanium and so on. Even when the material for thermal spraying is formed of ceramics, until the material reaches the object, the energy is given to the material in such a manner that the flying speed of the material is increased, impact speed of the material is increased, and the material collides against the object at a high speed. Therefore, the thermal sprayed layer is advantageously improved in adhesion strength.

When the material for thermal spraying is formed of ceramics, the induction heating is not obtained in the material unlike metal. For ceramics does not have conductivity substantially. In case where the passage through which the material for thermal spraying passes is formed of carbon tube, the carbon tube can be heated by induction heating, and the material for thermal spraying in the carbon tube is heated by radiant heat from the carbon tube.

According to a preferable mode, the heating of material is carried out by a first energy source, and the adding of energy for increasing the flying speed of material is carried out by a second energy source. Also, according to another preferable mode, the first energy source have one path and another path for transmitting energy thereof, the heating of material is carried out by the one path of the first energy source, and the adding of energy for increasing the flying speed of the material is carried out by the another path of the first energy source. The first energy source is not restricted in kinds. So, the first energy source can be a flame-generating means for generating a flame of fuel (acetylene and propane, etc.)-oxygen, a plasma-flame generating means for generating a plasma flame, a laser means for generating a laser beam, or an induction heating means for heating the material for thermal spraying by induction heating. The induction heating means includes the case in which the passage or the passage-forming member is induction-heated and the material is heated by radiant heat of the heated passage or the heated passage-forming member.

The present invention permits the case in which the heating of the material for thermal spraying is carried out by using the first energy source, and the increasing of flying speed of the material for thermal spraying is carried out by using the second energy sources unlike the first energy source. This case allows the first energy source and the second energy source to be controlled independently and individually. So, this case allows the heating of material and the increasing of the flying speed of material to be controlled independently and individually. Therefore, this case can enlarge an adjustable range in temperature and flying speed of the material for thermal spraying. Accordingly, this case can select a mode in which the temperature of material is high and the flying speed of material is high, another mode in which the temperature of material is low and the flying speed of material is high, or still another mode in which the temperature of material is high and the flying speed of material is low.

The present invention permits the case in which the heating of material is carried out by the one path of the first energy source, and the adding of energy for increasing the flying speed of material is carried out by the another path of the first energy source. This case allows the heating of material and the increasing of flying speed of the material to be controlled. This case can enlarge an adjustable range in temperature and flying speed of the material for thermal spraying.

The first energy source is not restricted in kinds for heating the material. The first energy source can be a flame-generating means for generating a flame of fuel (acetylene and propane)-oxygen, a plasma-flame generating means for generating a plasma flame, or a laser means for generating a laser beam. In a preferable mode, a material for thermal spraying has conductivity and magnetic permeability, and the first energy source may be constituted by an induction heating means for heating the material for thermal spraying. The induction heating means can control the degree of heating of the material—low temperature, medium temperature or high temperature—by adjusting frequencies of alternating current, current value, electric power, etc. The speed-increasing means may be a means which uses a swelling gas pressure obtained by expanding gas or by evaporating liquid in short time—for example, by evaporating liquid with the laser beam.

Thermal spraying apparatus concerning the second aspect includes: (1) a passage-forming member for forming a passage through which the material for thermal spraying passes; (2) a heating means for heating the material passing through the passage-forming member or discharged from the passage-forming member; and (3) a speed-increasing means for adding energy to the material for thermal spraying to increase a flying speed of the material and to accelerate the flying speed of the material. The speed-increasing means may increase the flying speed of the material than that of the material during heating. The heating means for concerning the thermal spraying apparatus of the second aspect may be a flame-generating means for generating flame of fuel (acetylene and propane)-oxygen, a plasma flame generating means for generating plasma flame, a laser means for generating a laser beam, or an induction heating means for heating the material for thermal spraying.

The thermal spraying apparatus concerning the above mentioned second aspect can be used in carrying out the first aspect of the present invention method, increasing the flying speed of the material for thermal spraying.

The powder passage apparatus concerning the third aspect comprises: (1) a conductive coil having conductivity and having an axis and a plurality of loops disposed substantially coaxially with respect to the axis; and (2) a passage-forming member disposed along the axis of the conductive coil for supplying material for thermal spraying.

According to the powder passage apparatus concerning the third aspect, when powder material has magnetic permeability, it is suppressed that the powder material for thermal spraying adheres to the inner surface of the passage of the passage-forming member. The reason is as follows: when current is supplied to the conductive coil, the conductive coil generates magnetic force along the central axis line of the conductive coil. So, the powder material for thermal spraying, having magnetic permeability, easily flows along the center portion in a radial direction of passage under the influence of the magnetic force. In the case where the material for thermal spraying is powder, when the powder passage apparatus concerning the third aspect is used as a powder passage apparatus of the thermal spraying apparatus, it is suppressed that the powder material for thermal spraying adheres to the inner surface of the passage. Therefore, this can suppress abnormal blockage of the material for thermal spraying in the passage. So, this can suppress inequality in heating the powder material for thermal spraying. Thus, the powder material for thermal spraying is uniformly heated as much as possible to high temperature, and the thermal sprayed layer is advantageously improved in adhesion strength.

BRIEF DESCRIPTION OF THE DRAWINGS

The present invention will now be shown and described in terms of concrete embodiments thereof with reference to the appended drawings, in which:

FIG. 2 is related to a first embodiment, and schematically shows an internal construction of a gun constituting the thermal spraying apparatus;

FIG. 3 is related to the first embodiment, and shows a graph which expresses selectivity between temperature of material particles and flying speed of the material particles;

FIG. 4 is related to a comparison embodiment, and shows a graph which expresses selectivity between temperature of material particles and flying speed of the material particles;

DETAILED DESCRIPTION OF THE PREFERRED EMBODIMENT

The first Preferred Embodiment

Figure 1:
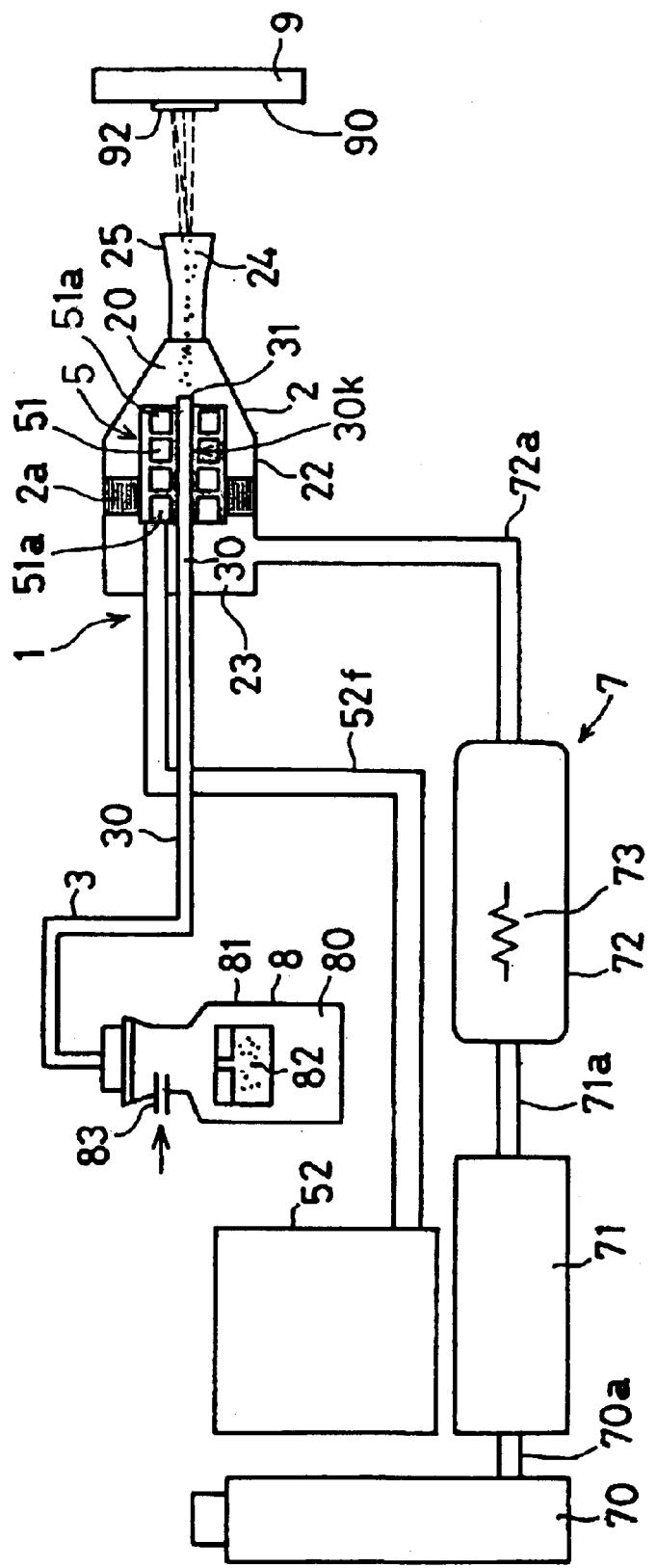
FIG. 1 is related to a first embodiment, and schematically shows a configuration in which material is sprayed by a thermal spraying apparatus.

The first preferred embodiment will hereinafter be explained based on the accompanying FIGS. 1–5. First, a thermal spraying apparatus of the present embodiment will be explained. As shown in FIG. 1, the thermal spraying apparatus has a passage-forming member 1, a heating means 5 (a first energy source), and a speed-increasing means 7 (a second energy source). The passage-forming member 1 forms a passage through which material passes having a powder shape for thermal spraying. The heating means 5 heats the material in the passage of the passage-forming member 1 for thermal spraying. The speed-increasing means 7 increases a flying speed of the material for the thermal spraying in comparison with the flying speed in a heating position 30k based on the heating means 5.

The passage-forming member 1 concerning the thermal spraying apparatus has a gun 2 working as a first passage-forming member forming a first passage 20, and a second passage-forming member 3 having a tubular shape and forming a second passage 30 for supplying the material for thermal spraying. The gun 2 includes: a gun body 22 having a high pressure room 23 which is communicated with the first passage 20; and a nozzle 25 disposed at the head of the gun body 22 and having a nozzle hole 24 which is communicated with the high pressure room 23. The nozzle 25 is formed of a "Laval nozzle" used for a supersonic gas stream apparatus such as jet engine. As shown in FIG. 2, the high pressure room 23 and the first passage 20 is disposed coaxially around the second passage 30. The first passage 20 of the gun 2 surrounds an exit 31 of the second passage 30.

As shown in FIG. 1, the second passage-forming member 3 connects a powder feeder 8 with the gun 2. The powder feeder 8 contains a container 81 having a powder room 80, material 82 having a powder shape for thermal spraying stored in the container 81, and a pressure portion 83 for increasing an internal pressure of the powder room 80. The material 82 for thermal spraying is formed of ferrous powder having conductivity and magnetic permeability, and it is to be heated by induction heating. The ferrous powder is Fe-C alloy.

When the pressure of gas such as air is applied to the powder room 80 of the container 81 by way of the pressure portion 83, the material 82 in the container 81 flies through the second passage 30 of the second passage-forming member 3 to the gun 2, it is discharged from the exit 31 formed at the top end of the second passage 30, and in addition, it is blown forward by way of the first passage 20 and the nozzle 25 of the gun 2. The heating means 5 heats the material for thermal spraying by using electricity. The heating means 5 is disposed at a heating position 30k located in the exit 31 of the second passage 30. This heating means 5 contains a conductive coil 51 and feeding means 52. The conductive coil 51 works as an induction heating coil, being disposed by jig 2a at the heating position 30k inside the gun 2. The feeding means 52 supplies current, alternating current having a high frequency to the conductive coil 51 by way of a feeding line 52f. The feeding means 52 is constituted by a high frequency oscillator for generating alternating current of high frequency. The conductive coil 51 works as an induction heating coil, being the induction heating means. The conductive coil 51, having a coil shape, is formed of a plurality of loops 51a connected to each other in series.

As shown in FIG. 2, the conductive coil 51 is placed outside the second passage 30 and substantially coaxially with respect to the second passage 30. That is to say, the conductive coil 51 surrounds the exit 31 of the second passage-forming member 3 which forms the second passage 30. Therefore, it is thought that the supplying of current to the conductive coil 51 generates magnetic force along the central axis line of the second passage 30, namely, along the central axis line of the conductive coil 51.

The parts being surrounded by the conductive coil 51, in the second passage-forming member 3, can be formed of non-electro-conductive substance such as the silica-based substance, or electro-conductive substance such as carbon-based substance. The non-electro conductive substance such as silica-based substance is not substantially induction-heated. The electro-conductive substance such as carbon-based substance is induction-heated, it becomes a high temperature, for instance over 1500° C. and over 2000° C., it can transmit radiant heat to the powder material for thermal spraying which passes through the second passage 30, and it can heat the material for thermal spraying to high temperatures by the radiant heat.

The inside diameter of the second passage 30 is decided considering factors such as passing ability and heating of the powder material for thermal spraying. The inside diameter of the second passage 30 may be, for example, in a range of 0.5–20 mm, in a range of 1–10 mm, and in a range of 1–5 mm. The inside diameter is not limited to these ranges.

The speed-increasing means 7 is formed by using a second energy source being independent of the first energy source. As shown in FIG. 1, the speed-increasing means 7 includes: a gas-storing division 70 formed by a gas bomb which encloses high pressure gas; a compressor 71 connected with the gas-storing division 70 by way of a middle passage 70a; and a pressure amplifier 72 connected with the compressor 71 by way of a middle passage 71a. The pressure amplifier 72 has a heating unit 73, such as electric heaters, for heating the gas supplied from the compressor 71.

The gas being contained in the gas-storing division 70 is continuously supplied to the compressor 71. The gas is compressed by the compressor 71. Afterward, the gas is supplied to the pressure amplifier 72, and it is continuously heated to high temperature in the heating unit 73 of the pressure amplifier 72. Therefore, the gas expands, and the swelling pressure of the gas becomes high pressure. In short, the pressure of the gas is amplified. The high-pressurized gas is continuously supplied to the high pressure room 23 of the gun 2 through the middle passage 72a, it becomes a high speed gas stream, and it is continuously blown forward from the nozzle 25 by way of the first passage 20 of the gun 2.

The type of gas being contained in the gas-storing division 70, namely, the type of the high speed gas stream for increasing the flying speed of the material for thermal spraying is not restricted—for example at least one selected from the group consisting of inert gas such as helium gas, nitrogen gas, air gas, oxygen gas, hydrogen gas, etc. The preferable mode selects gas whose molecular weight is small—for example the helium gas—in view of obtaining the high-speed gas stream generated by using the swelling gas pressure based on gas expansion. Also, air gas is preferable in view of cost.

It is desirable that the surface 90 of the object 9 for thermal spraying is carried out by roughening treatment. The roughening treatment may be blasting—for example shot blasting treatment, grid blasting treatment, etc. The material of the object 9 can be selected on occasion—generally metal. The metal of object 9 may be at least one of non-ferrous alloy or ferrous alloy. The non-ferrous alloy may be aluminum, aluminum alloy, copper, copper alloy, titanium, titanium alloy, etc. The ferrous alloy may be cast iron, carbon steel, stainless steel, alloy steel, etc. The object 9 may be sliding parts, pistons, cylinder blocks, cylinder heads, etc.—it is not restricted in usage.

Next, as shown in FIG. 1, thermal spraying will be explained. The object 9 is placed in the front of the nozzle 25 of the gun 2. The nozzles 25 of the gun 2 faces to the object 9 at a fixed distance. The feeding means 52 feeds current to the conductive coil 51. The current is alternating current having a high frequency. The frequency is decided depending on kinds of the material for thermal spraying, material kinds of the object 9, cost for the feeding means 52, etc. For example, as for frequency of the alternating current to the conductive coil 51, the upper limit may be for example 5000 kHz, 20 MHz or 100 MHz, and the lower limit is for example 5 kHz, 20 kHz and 100 kHz or 200 kHz. The frequency is not limited to these.

In thermal spraying, the pressure of gas such as air is applied to the powder room 80 of the container 81 by way of the pressure portion 83. The powder material for thermal spraying in the container 81 is supplied to the second passage 30 of the second passage-forming member 3. In addition, the powder material for thermal spraying flows to the exit 31 of the second passage 30 of the second passage-forming member 3, and it is blown forward from the nozzle 25 by way of the first passage 20 of the gun 2. The powder material for thermal spraying is induction-heated to high temperature in a short time by the conductive coil 51, when it passes near the exit 31 of the second passage 30, namely, the heating position 30k.

Figure 8:
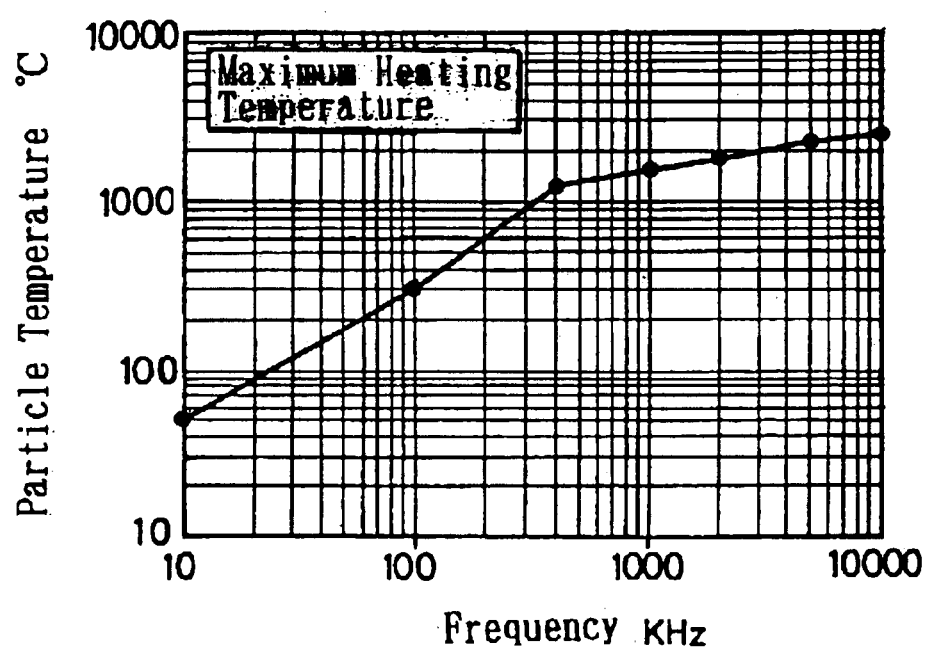
FIG. 8 shows a graph which expresses a relationship between frequency of alternating current supplied to a conductive coil constituting an induction heating coil and temperature of particle material.
Figure 9:
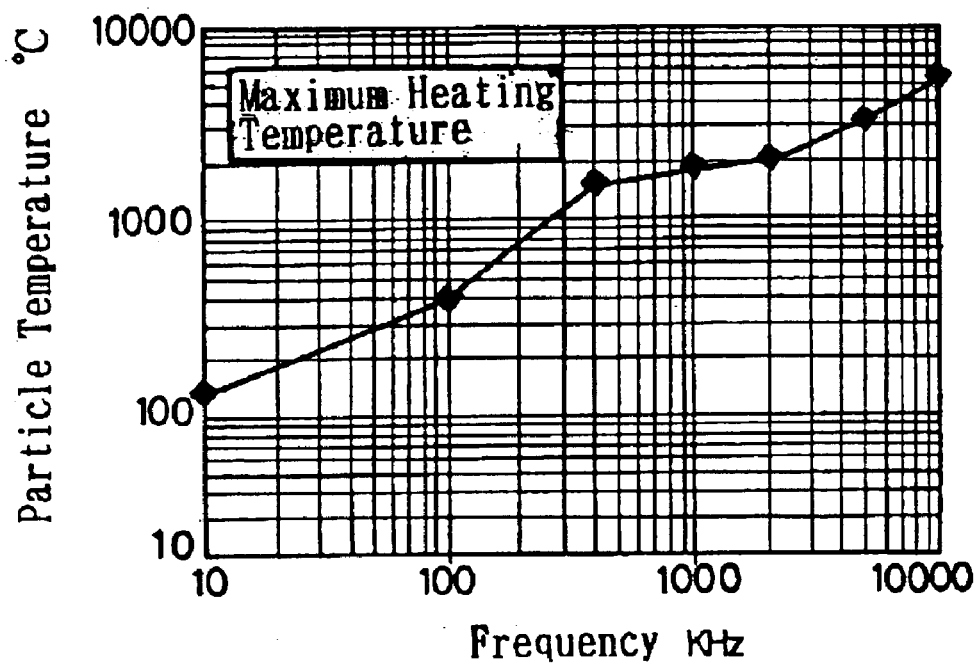
FIG. 9 shows a graph which expresses a relationship between frequency of alternating current supplied to a conductive coil constituting an induction heating coil and temperature of particle material.

Temperature of the material for thermal spraying is decided depending on frequencies of alternating current of the conductive coil 51—over 500° C., over 800° C., over 1000° C., over 1500° C., over 1700° C., over 2000° C. or over 2400° C., as appreciated from FIGS. 8 and 9.

According to the present embodiment, in thermal spraying, the gas stored in the gas-storing division 70 is continuously supplied by the compressor 71, it is compressed by the compressor 71, and it is heated to high temperature in the heating unit 73 of the pressure amplifier 72. As a result, the gas is amplified in pressure, and it is continuously supplied to the high pressure room 23 of the gun 2, and thereby it is blown forward from the nozzle 25 as a high speed gas stream. Therefore, after the material is heated to the high temperature by the conductive coil 51 at the heating position 30k, it is discharged from the exit 31 of the second passage 30 as the high speed gas stream. The high speed gas stream forces the material for thermal spraying to accelerate the flying speed. The high speed gas stream flows from the high pressure room 23 to the nozzle 25. In short, the flying speed of the material for thermal spraying is increased at the nozzle 25 than at the heating position 30k to be heated by the conductive coil 51. That is to say, according to the present embodiment, the energy is given to the material for thermal spraying in such a manner that the material for thermal spraying is increased in the flying speed in the gun 2, until the material reached the object 9.

The material being increased in flying speed collides against the surface 90 of the object 9 at a high speed. As a result, the material for thermal spraying is piled on the surface 90 of the object 9 to form a thermal sprayed layer 92. The flying speed of the material is decided depending on kinds of the material for thermal spray and kinds of the pressure amplifier 72—for example over 400 m/sec, over 500 m/sec, over 600 m/sec, over 700 m/sec, over 800 m/sec, or over 900 m/sec—below 3000 km/sec. The flying speed of the case having the speed-increasing means 7 may be 1–70 times or 5–70 times as large as that of the case not having the speed-increasing means 7.

According to the present embodiment, the speed-increasing means 7 forces the material for thermal spraying in such a manner that the material for thermal spray is increased in the flying speed until the material reaches the object 9. Therefore, the material for thermal spraying collides against the surface 90 of the object 9 at a high speed. So, the thermal sprayed layer 92 is increased in adhesion strength.

According to the present embodiment, the flying speed of the accelerated material is increased in comparison with that thereof at heating position 30k. In other words, the flying speed of the material at the heating position 30k, before the acceleration, is lower than that of the material after the acceleration. Therefore, the present embodiment can lengthen the time for heating the material for thermal spraying to a target temperature range, thereby ensuring ability for heating the material for thermal spraying.

Figure 5A:
FIG. 5(A) is related to a comparison embodiment, and shows a photograph which expresses a sedimentation form of particles constituting a thermal spraying layer.
Figure 5B:
FIG. 5(B) is related to a comparison embodiment, and shows a magnified photograph which expresses a sedimentation form of particles constituting a thermal spraying layer.

FIG. 5(A) shows a photograph concerning to a sample of the thermal sprayed layer formed on the object 9. FIG. 5(B) shows a magnified photograph. As shown in FIGS. 5(A) and 5(B), it is understood that the particles of the material accelerated to high speed encroached upon the surface of the object in such a manner that the particles of material is located inside the surface of the object. Therefore, the thermal sprayed layer is improved in adhesion strength. The reason is acceleration in the flying speed of the material for thermal spraying.

The heating of the material for thermal spraying is carried out by the conductive coil 51 which works as the induction heating means—the first energy source. The increasing of flying speed of the material is carried out by the speed-increasing means 7—the second energy source, being different from the first energy source. Therefore, the present embodiment allows the conductive coil 51 for heating the material to be controlled independent of the speed-increasing means 7 for accelerating the material. So, the present embodiment allows the accelerating of the material to be controlled independent of the heating of the material. Therefore, this can enlarge a range for adjusting temperature and speed of the material for thermal spraying in comparison with the conventional thermal spraying.

FIG. 3 shows a control model. As shown in FIG. 3, the present embodiment allows temperature of the material for thermal spraying to be adjusted between temperature "T1" exhibiting low temperature and temperature "T2" exhibiting high temperature. Also, the present embodiment allows speed of the material for thermal spraying to be adjusted between speed "V1" exhibiting low speed and speed "V2" exhibiting high speed. Therefore, the present embodiment is advantageous in enlarging an adjustable range of temperature and speed for the material for thermal spraying, and in obtaining the thermal sprayed layer having the desired characteristics.

By the way, "M1" of FIG. 4 shows an adjustable range of temperature and speed of the material for thermal spraying in the plasma spraying method used, the conventional technique. "M2" of FIG. 4 shows an adjustable range of temperature and speed of the material for thermal spraying in HVOF (High Velocity oxygen-Fuel) thermal spraying, the conventional technique. In the conventional plasma spraying method, heating and flying of the material for thermal spraying are carried out by a common energy source of the plasma flame. In the conventional HVOF thermal spraying, heating and flying of the material for thermal spraying are carried out by a common energy source of gas combustion, and the particle flying speed of HVOF thermal spraying is faster than that of the plasma spraying method.

In the conventional plasma spraying method, as shown by "M1" of FIG. 4, temperature of the material for thermal spraying is lowered, as flying speed of the material for thermal spraying is increased. Also, temperature of the material for thermal spraying is raised, as flying speed of the material for thermal spraying is decreased. In the conventional HVOF spraying method, as shown by "M2" of FIG.

4, temperature of the material for thermal spraying is lowered, as flying speed of the material for thermal spraying is increased. Also, temperature of the material for thermal spraying is raised, as flying speed of the material for thermal spraying is decreased. The plasma spraying method and the HVOF thermal spraying concerning convention techniques have a limit for enlarging the adjustable range of temperature and flying speed of the material for thermal spraying.

According to the present embodiment, the conductive coil 51 heats the ferrous material for thermal spraying having a powder shape which passes the second passage 30 of the second passage-forming member. According to the induction heating, when frequency of alternating current of the conductive coil 51 is adjusted, heating temperature of material for thermal spraying can be easily adjusted in a considerable range, as shown in FIGS. 8 and 9. That is to say, the present embodiment can easily adjust heating temperature of the material for thermal spraying in a considerable range so as to improve adhesion strength of the thermal sprayed layer. In this meaning, induction heating is advantageous in improving characteristic property, such as adhesion strength, of thermal sprayed layer.

It is suppressed that the material for thermal spraying adheres to the inner surface of the second passage 30 of the second passage-forming member 3, when current is supplied to the conductive coil 51. This fact is confirmed based on the test by the present inventors. The reason is as follows. The conductive coil 51 generates magnetic force along the central axis line of the second passage 30, namely, along the central axis line of the conductive coil 51. So, the powder material for thermal spraying easily flows along the center portion in the radial direction of second passage 30. Still, the neighborhood of the exit 31 of the second passage 30 constitutes the powder passage apparatus concerning the third aspect.

Second Preferred Embodiment

Figure 6:
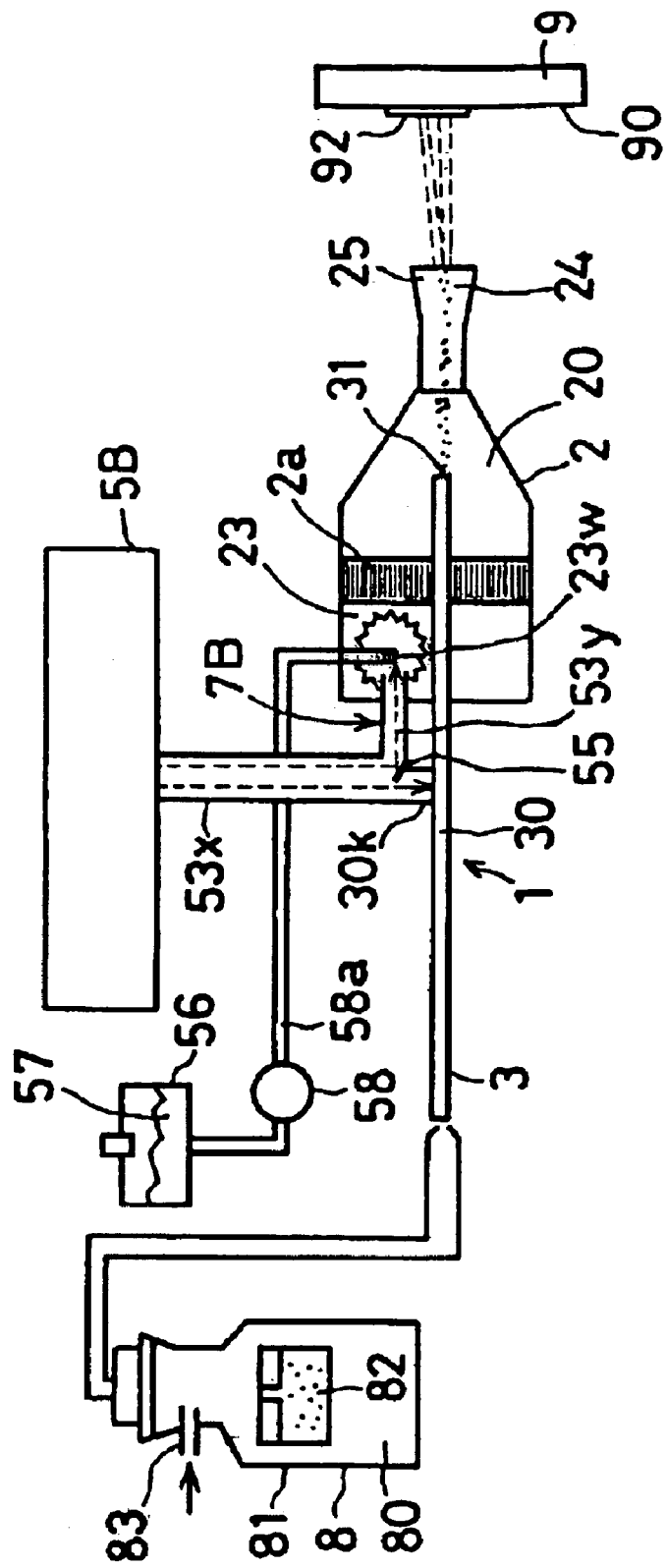
FIG. 6 is related to a second embodiment, and shows a configuration which schematically expresses conditions in which material is thermal-sprayed by a thermal spraying apparatus.

The second embodiment will be explained with FIG. 6. The second embodiment is fundamentally similar to the first embodiment in construction, action and effect. First, the thermal spraying apparatus of the present embodiment will be explained. As shown in FIG. 6, the thermal spraying apparatus contains: a passage-forming member 1 for forming a passage through which ferrous powder material for thermal spraying passes; a heating means 5B for heating the ferrous powder material which is supplied through the passage-forming member 1, and a speed-increasing means 7B. The speed-increasing means 7B increases the flying speed of the material for thermal spraying in comparison with the flying speed in heating position based on the heating means 5B.

The passage-forming member 1 concerning the thermal spraying apparatus has a gun 2 working as a first passage-forming member having a first passage 20, and a second passage-forming member 3 having a tubular shape and having a second passage 30 for supplying the material.

The second passage-forming member 3 connects a powder feeder 8 with the gun 2. The powder feeder 8 contains a container 81 having a powder room 80, material 82 having a powder shape for thermal spraying being stored in the container 81, and a pressure portion 83 for increasing an internal pressure of the powder room 80. When the gas pressure is applied to the powder room 80 of the container 81, the powder material stored in the container 81 flows to the gun 2 through the second passage 30 of the second passage-forming member 3.

The heating means 5B heats the material in the second passage 30 for thermal spraying using the laser beam which is high-density energy beam exhibiting the first energy source. The heating means 5B is formed by the laser oscillator which discharges a laser beam 53$x$ with high energy density such as YAG laser beam and CO2 laser beam. The path of laser beam 53$x$, constituting one path, is connected to a heating position 30$k$ of the second passage 30. So, when the powder material for thermal spraying passes through the second passage 30 of the second passage-forming member 3, it is heated by laser beam 53$x$ (one path) discharged by the heating means 5B to the target temperature range.

The speed-increasing means 7B is constituted to use gas pressure to be increased by the laser beam 53$y$ (another path) being separated from the laser beam 53$x$ corresponding to the first energy source. That is to say, the speed-increasing means 7B contains a beam splitter 55, a container 56 containing evaporating substance 57 (it is generally a liquid for vaporization), and a pump 58. The beam splitter 55 splits the laser beam 53$y$ from the laser beam 53$x$ in order to send the laser beam 53$y$ to an irradiation portion 23$w$ in the high pressure room 23 of the gun 2. The pump 58 works as an evaporating substance feeding means which continuously supplies the evaporating substance 57 to the irradiation portion 23$w$ in the high pressure room 23 of the gun 2 by way of a feeding line 58$a$. The evaporating substance 57 may be formed by dispersing fine particles in liquid. The liquid may be at least one of water, alcohol, organic solvents, etc. The fine particles have good absorbability with respect to the laser beam. The fine particle, such as carbon particles, may be formed of substance having good absorbability with respect to the laser beam. When the evaporating substance 57 is irradiated with by laser beam 53$y$ (another path), it is gasified in a moment.

According to the present embodiment, the pump 58 supplies the evaporating substance 57 to the irradiation portion 23$w$ disposed in the high pressure room 23 of the gun 2 by way of the feeding line 58$a$. The irradiation portion 23$w$ in the gun 2 is irradiated with the laser beam 53$y$ which is split by the beam splitter 55 as another path. The evaporating substance 57 includes the fine particles having good absorbability withe respect to the laser beam, and it is gasified in a moment to high temperature. According to the present embodiment, the pump 58 supplies the evaporating substance 57 continuously to the irradiation portion 23$w$ of the high pressure room 23, and the laser beam 53$y$ being split by the beam splitter 55 is continuously discharged to the evaporating substance 57 in the irradiation portion 23$w$ of the high pressure room 23. So, the evaporating substance 57 is continuously gasified to generate the high speed gas stream in the high pressure room 23. The high speed gas stream is blown forward from the nozzle 25 by way of the first passage 20 of the gun 2. This gives energy to the material for thermal spraying discharged from the exit 31 of the second passage 30. Accordingly, this accelerates the material for thermal spraying discharged from the exit 31 of the second passage 30 in flying speed. As a result, this increases the flying speed of the material for thermal spraying discharged from the exit 31 of the second passage 30 in comparison with that of the heating position 30$k$.

So, the material collides against the surface 90 of the object 9 at a high speed to be piled up. Therefore, thermal sprayed layer 92 is formed on the surface 90 of the object 9. According to the present embodiment, the speed-increasing means 7B forces the material for thermal spraying to accelerate in such a manner that the material for thermal spray is increased in flying speed until the material reaches the object 9. Therefore, the material for thermal spraying collides against the surface 90 of object 9 at a high speed. So, thermal sprayed layer 92 is increased in adhesion strength.

According to the present embodiment, the flying speed of the accelerated material is increased in comparison with that of the heating position 30k. In other words, the flying speed of the material at the heating position 30k, before the acceleration, is lower than that of the material just after the acceleration. Therefore, the present embodiment can lengthen the time for heating the material for thermal spraying to a target temperature range, thereby ensuring ability for heating the material for thermal spraying.

EXAMPLES

Next, examples carried out by the present inventors will be explained.

Example 1

Figure 7:
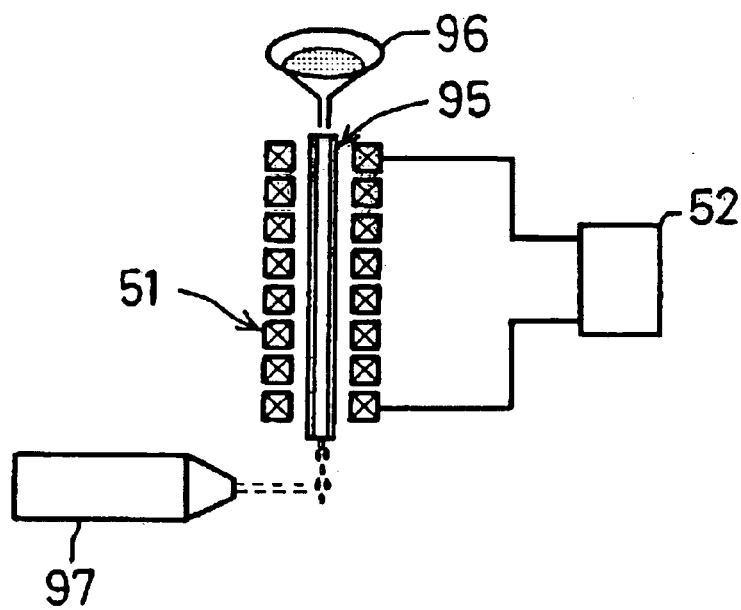
FIG. 7 schematically shows a powder passage apparatus which heats the material for thermal spraying by means of induction heating, and measures temperature of the particle material for thermal spraying.

FIG. 7 shows the powder passage apparatus concerning Example 1. In Example 1, a silica tube 95 was disposed vertically and coaxially with respect in the central region of a conductive coil 51, and the conductive coil 51 was placed vertically for working as induction heating coil. The silica tube 95 constitutes a passage-forming member. In this condition, the present inventors: fell the metallic powder naturally from a funnel 96 disposed at an upper side of the conductive coil 51; and measured temperature of the metallic powder, namely, material for thermal spraying discharged from a lower end of the silica tube 95 by use of a measuring device 97. The measuring device 97 measured temperature and flying speed of the particle.

In Example 1, the present inventors varied the frequency of the alternating current of the conductive coil 51 in a range of 10 kHz–10000 kHz (10 MHz). The metallic powder was iron-carbon alloy having conductivity and magnetic permeability, having a carbon content of 1 mass % (1 weight %), and having a particle size of 50–90 μm.

FIG. 8 shows the test result. As shown in FIG. 8, with the increase of the frequency of the alternating current which was fed to the conductive coil 51, the particle temperature of the powder discharged from the lower end of the silica tube 95 became high temperature. Concretely, powder particle temperature was about 300° C. when frequency was 100 kHz. Powder particle temperature was about 1000° C. when frequency was 400 kHz. Powder particle temperature exceeded 2000° C. when frequency was 10000 kHz. It is understood that the frequency of the alternating current of the conductive coil 51 is preferable over 400 kHz or 1000 kHz for raising the particle temperature, based on the result of FIG. 8.

In Example 1, the present inventors have confirmed that the metallic powder flows along the central axis of the silica tube 95 in the case where current is supplied to the conductive coil 51 in comparison with the case where current is not supplied to the conductive coil 51. When direct current is supplied to the conductive coil 51, the similar fact is obtained.

Example 2

In Example 2, a carbon tube was used instead of the silica tube 95 in FIG. 7, the present inventors measured the temperature of the powder discharged from the lower end of the carbon tube by use of the measuring device 97. The present inventors varied frequency of alternating current in a range of 10 kHz–10000 kHz (10 MHz). The conductive coil 51 was vertically disposed, having a central axis line positioned perpendicularly. The metal powder of Example 2 was the same as that of Example 1.

FIG. 9 shows the test result. As shown in FIG. 9, with the increase of frequency of alternating current supplied to the conductive coil 51, the particle temperature of powder became high temperature. Concreatly, powder particle temperature was about 400° C. when frequency was 100 kHz. The powder particle temperature was about 1500–1600° C. when the frequency was 400 kHz. Powder particle temperature was about 2000° C. when frequency was 2000 kHz. Powder particle temperature exceeded 3000° C. when frequency exceeded 3000 kHz. Based on FIG. 9, it is understood that frequency is preferably over 400 kHz or 1000 kHz to raise powder particle temperature.

In Example 2, the carbon tube for supplying the metallic powder was placed in the central region of the conductive coil 51. So, the carbon tube was induction-heated to high temperature of red heat condition or white heat condition. That is to say, depending on frequency and electric energy, the temperature of carbon tube itself became over 1000K, 1500K, 2000K or 2500K. Therefore, the metal powder was heated not only by induction-heating because of the conductive coil 51 but also by radiation heat because of the heated carbon tube so as to increase efficiency for heating.

Investigation

Figure 10:
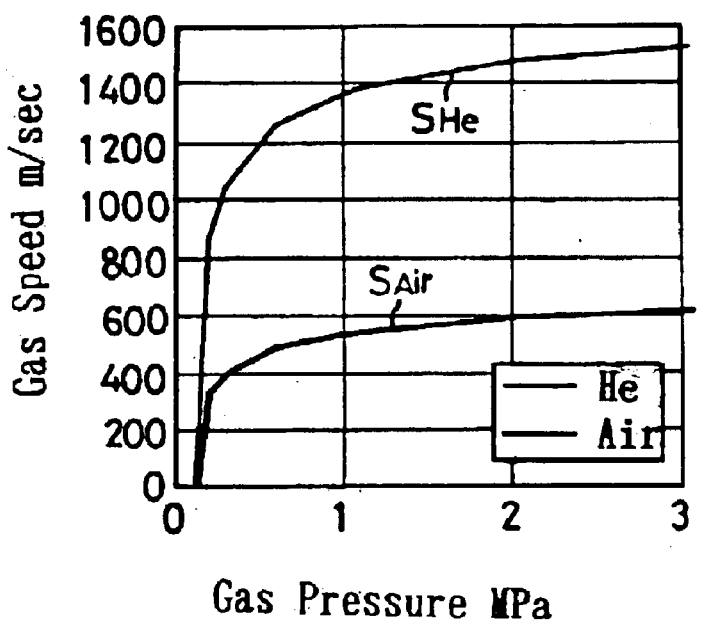
FIG. 10 shows a graph which expresses a relationship between gas pressure and gas speed.

The present inventors required a relationship between gas pressure in front of "Laval nozzle" and speed of gas blown from "Laval nozzle", on the basis of the calculation. FIG. 10 shows this result. In FIG. 10, characteristic line "SHe" shows the result in using helium gas, and characteristic line "SAir" shows the result in using air gas. As shown at characteristic line "SAir" of FIG. 10, gas speed was about 500 m/sec when air gas was used, gas speed was about 500 m/sec when gas pressure was 1 MPa. Gas speed was about 600 m/sec when gas pressure was 3 MPa. However, as shown at characteristic line "SHe" of FIG. 10, in using helium gas, when gas pressure is 0.5 MPa, gas speed is considerably high-speed, exceeding 1000 m/sec. Further, as shown at characteristic line "SHe" of Further 10, gas speed exceeded 1300 m/sec when gas pressure was 1 MPa, and gas speed exceeded 1400 m/sec when gas pressure was 2 MPa. It is appreciated that helium gas is more effective than air gas to increase gas speed.

Figure 11:
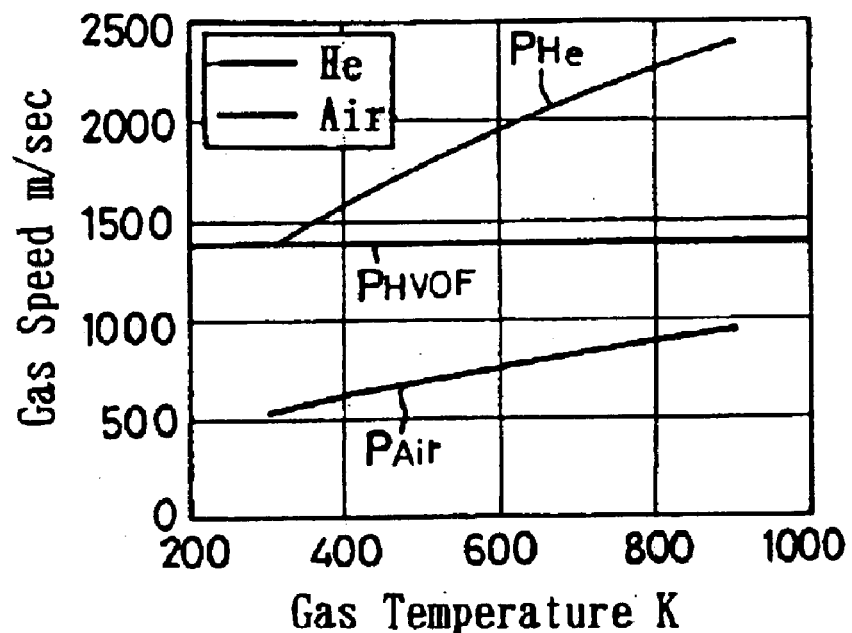
FIG. 11 shows a graph which expresses a relationship between gas temperature and gas speed.

The present inventors required a relationship between speed and temperature of gas blown from "Laval nozzle" based on calculation. FIG. 11 shows this result. In FIG. 11, characteristic line "PHe" shows the result in using helium gas, and characteristic line "PAir" shows the result in using air gas. The speed of gas blown from the nozzle gradually increases when gas temperature is high, as shown from characteristic lines "PAir" and "PHe" of FIG. 11. Therefore, it is appreciated that high temperature of gas is effective for increasing the flying speed of the material for thermal spraying.

As shown at characteristic line "PAir" of FIG. 11, in using air gas, when gas temperature was 400–800K, the gas speed was 600 m/sec–900 m/sec. However, in using helium gas having a low molecule weight, as shown at characteristic line "PHe" of FIG. 11, when the gas temperature was 400K, the gas speed exceeded 1500 m/sec, being high-speed. As shown at characteristic line "PHe" of FIG. 11, when the gas temperature was 600K, gas speed exceeded 2000 m/sec, being high-speed. When gas temperature was 800K, gas speed exceeded 2100 m/sec, being high-speed. Also, characteristic line "PHVOF" in FIG. 11 shows the gas speed of the conventional HVOF thermal spraying method. As understand from the comparison between characteristic lines "PHe" and "PHVOF" in FIG. 11, in using helium gas, when gas temperature was over 400K, the gas speed was higher than that of the conventional HVOF method.

Figure 12:
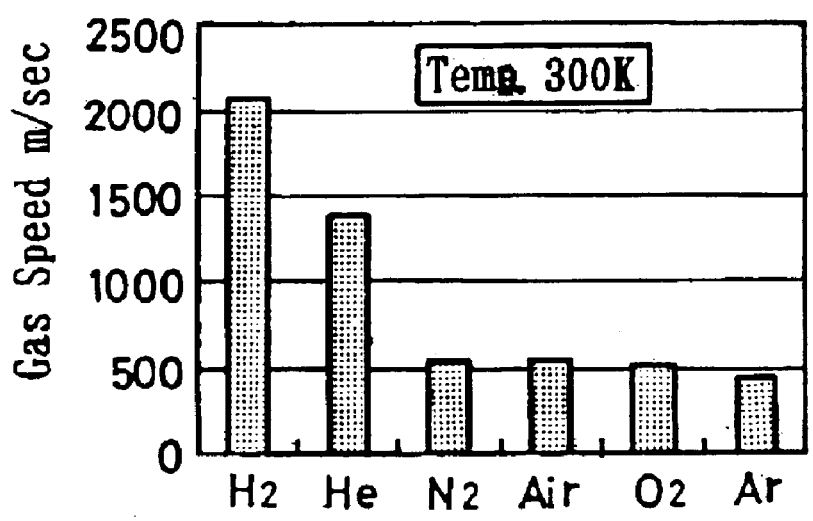
FIG. 12 shows a graph which expresses a relationship between types and speed of the gas.

Further, the present inventors: respectively selected gas from the group consisting of hydrogen gas (H2), helium gas (He), nitrogen gas (N2), air gas, oxygen gas (O2), argon gas (Ar); and required the speed of gas, at a temperature of 300 K, to be blown from the nozzle the gun 2, based on calculation. FIG. 12 shows these results. As shown in FIG. 12, gas speed was high when molecular weight of gas was small. It is appreciated that helium gas, having a low molecular weight, is effective in increasing the flying speed of the powder material for thermal spraying.

Example 3

The present inventors carried out thermal spraying actually based on the conditions shown in Table 1. In this case, the object had a polished surface, and was preheated at 100° C.

TABLE 1 comparison example ①

Particle temperature and particle speed in comparison example ① are similar to those of plasma flame thermal spraying being used as a conventional technique.

comparison example ②

Particle temperature and particle speed in comparison example ② are similar to those of HVOF thermal spraying being used as a conventional technique.

comparison example ③

Particle temperature and particle speed in comparison example ③ are lower than those of plasma flame thermal spraying and HVOF thermal spraying being used as a conventional technique.

comparison example ④

Particle temperature is higher in comparison example ④ than that of plasma flame thermal spraying and HVOF thermal spraying being used as a conventional technique, and particle speed is lower in comparison example ④ than that of plasma flame thermal spraying and HVOF thermal spraying.

present embodiment ⑤

Particle temperature and particle speed in present embodiment ⑤ are higher than those of plasma flame thermal spraying and HVOF thermal spraying being used as a conventional technique.

present embodiment ⑥

Particle temperature is lower in present embodiment ⑥ than that of plasma flame thermal spraying and HVOF thermal spraying being used as a conventional technique, and particle speed is higher in present embodiment ⑥ than that of plasma flame thermal spraying and HVOF thermal spraying.

Figure 13:
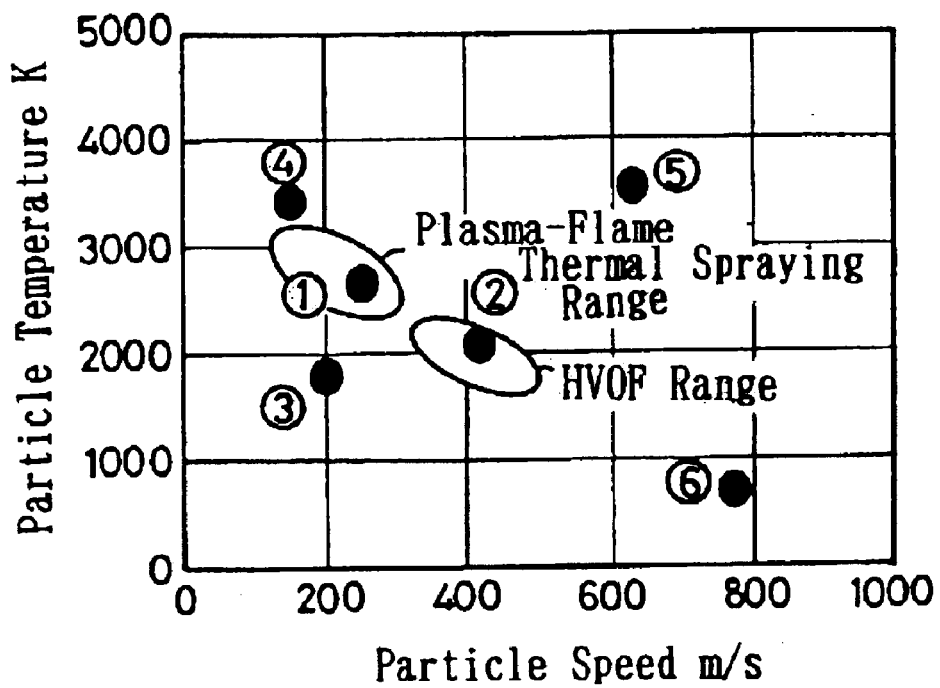
FIG. 13 shows a graph which expresses a relationship between particle speed and particle temperature in each thermal spraying form.

FIG. 13 shows testing conditions of Table 1. As shown in FIG. 13, in testing condition ①, the particle temperature in thermal spraying was about 2800K and the particle speed was about 240 m/sec. In testing condition ②, the particle temperature was about 2000K and the particle speed was about 400 m/sec. In testing condition ③, the particle temperature was about 1800K and the particle speed was about 200 m/sec. In testing condition ④, the particle temperature was about 3400K and the particle speed was about 160 m/sec. Testing conditions ① are correspondent to comparison examples. The speed of testing conditions ⑤ and ⑥ were to be high speed, being correspondent to the present embodiment. In testing condition ⑤, particle temperature were as high as 3600K, being high temperature, and the particle speed was as high as 620 m/sec. In testing condition ⑥ concerning the present embodiment, the particle temperature was as low as below 1000K, and the particle speed was as high as about 780 m/sec. Particle temperature and particle speed were obtained by the measuring device 97, namely, a device for measuring temperature and speed of thermal spraying particle.

In addition, the present inventors measured porosity by an image processing in laser microscope and adhesion strength of the thermal sprayed layer formed on the basis of Table 1 and FIG. 13. In this case, the object 9 was made of aluminum alloy (JIS-AC2C), and the material for thermal spraying was made of iron-carbon alloy powder (carbon: 1 mass %) produced by gas atomization to have a thickness of 0.2 mm.

Figure 14:
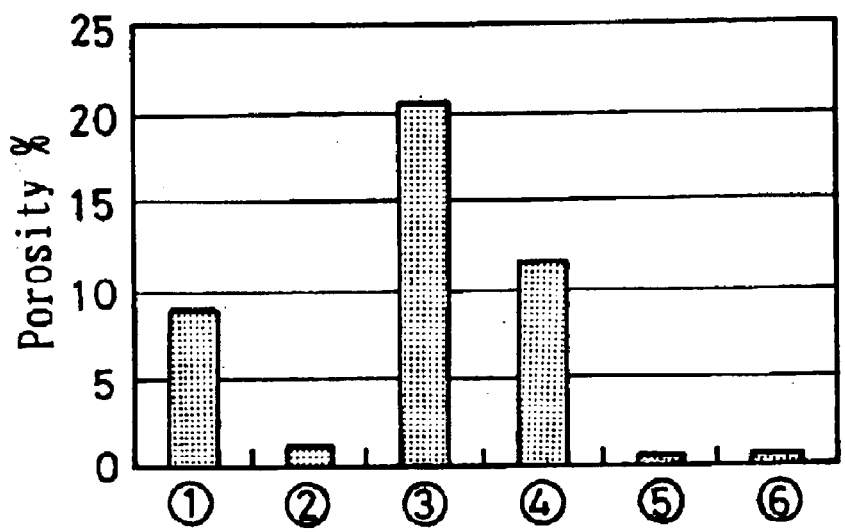
FIG. 14 shows a graph which expresses porosity of the thermal sprayed layer in each thermal sprayed layer.
Figure 15:
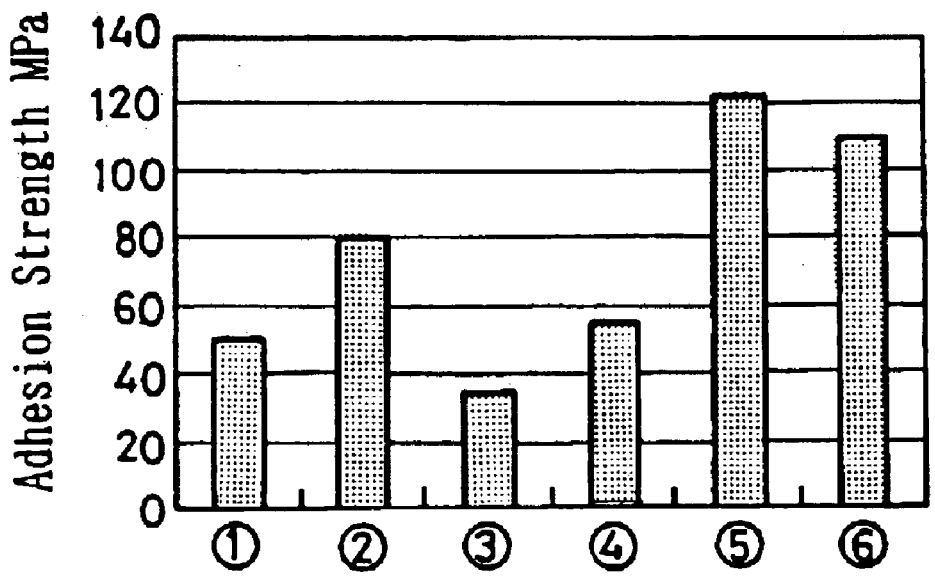
FIG. 15 shows a graph which expresses adhesion strength of the thermal sprayed layer produces by each thermal spraying form.

In measuring adhesion strength, the present inventors used test specimens covered with the thermal sprayed layer, added an external force to the thermal sprayed layer by a punch along an interface between the thermal sprayed layer and the object 9, and obtained adhesion strength based on the external force when the thermal sprayed layer was exfoliated. FIG. 14 shows the test result of porosity. FIG. 15 shows the test result of adhesion strength of thermal sprayed layer.

As shown in FIG. 14, testing conditions ①③ and ④ concerning comparison examples showed porosity as large as over 8%. Testing condition ③ showed porosity as large as over 20%—it is thought that the particle speed is slow and the particle temperature is low. Testing conditions ⑤ and ⑥ concerning the present embodiment showed porosity as small as 2% or less—it is thought that the thermal sprayed layer is fine in structure because speed of thermal spraying is fast.

Also, as shown in FIG. 15, as for testing conditions ①②③ and ④ concerning comparison example, adhesion strength of the thermal sprayed layer was not satisfied. As for testing condition ③, adhesion strength is as low as about 34 MPa—it is thought that the particle speed is slow and the particle temperature is low. As for testing conditions ⑤ and ⑥ concerning the present embodiment, adhesion strength of the thermal sprayed layer exceeded 100 MPa, being high. It is thought that the particle speed is high.

In comparison with testing conditions ⑤ and ⑥ concerning the present embodiment, test condition ⑥ exhibited excellent adhesion strength which is near that of testing condition ⑤, although particle temperature as low as about 800K. From this fact, it is thought that the increasing of the flying speed of the powder material for thermal spraying is effective to increase adhesion strength of the thermal sprayed layer.

Example 6

Figure 16:
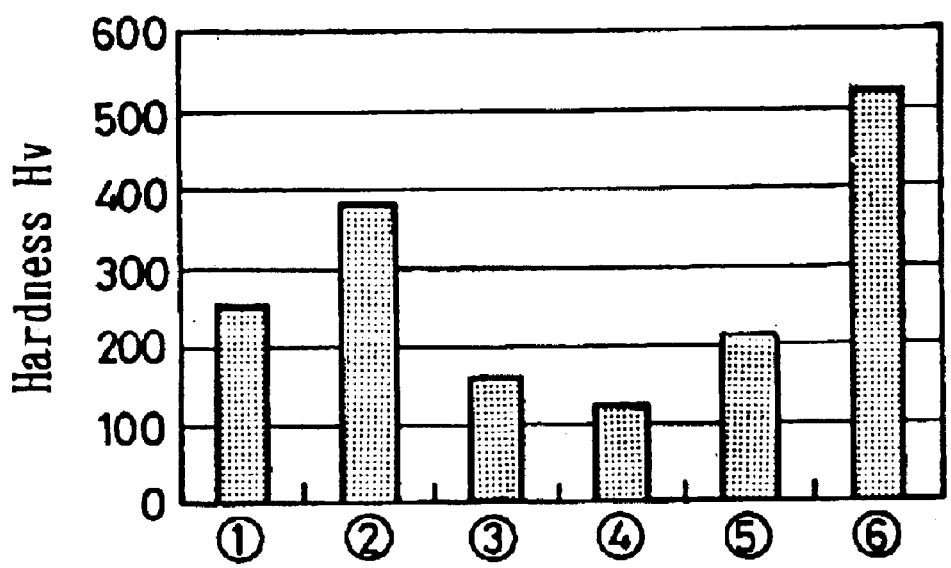
FIG. 16 shows a graph which expresses hardness of the thermal sprayed layer produces by each thermal spraying form.

The present inventors required hardness of the thermal sprayed layer formed based on the conditions of Table 1 and FIG. 13, by use of Vickers hardness test(load: 0.098N(10 gf)). In this case, the material for thermal spraying was iron-carbon alloy powder (carbon: 1 mass %) produced by water atomization. The material before thermal spraying had organization formed of bainitic structure, and hardness was about Hv600. FIG. 16 shows the result of hardness of the thermal sprayed layer. In case of the thermal sprayed layer produced in testing condition ⑥ concerning the present embodiment, the hardness of thermal sprayed layer exceeded Hv500. The reason why the hardness exceeds Hv500 is as follows: In case of the thermal sprayed layer produced in testing condition ⑥—in spite of particle speed as high as over 700 m/sec—since particle temperatures are as low as about 800K, the thermal spraying powder is not melted to easily keep organization and characteristics before thermal spraying.

Additional Remarks

It is possible to also grasp next technical thought from the above mentioned description.

According to each claims, wherein the flying speed of the material for thermal spraying is over 600 m/sec, over 700 m/sec or over 800 m/sec.

According to each claims, wherein adhesion strength (shear adhesion strength) of the thermal sprayed layer is over 90 MPa, over 100 MPa, over 110 MPa or over 120 MPa.

According to each claims, wherein particle temperature of material for thermal spraying is over 2000K, and particle speed of material for thermal spraying is over 600 m/sec, over 700 m/sec or over 800 m/sec.

According to each claims, wherein particle temperature of material for thermal spraying is over 3000K, and particle speed of material for thermal spraying is over 600 m/sec, over 700 m/sec or over 800 m/sec.

According to each claims, wherein particle temperature of material for thermal spraying is below 1500K or below 1000K, and particle speed of material for thermal spraying is over 600 m/sec, over 700 m/sec or over 800 m/sec.

A gun for thermal spraying comprising: a passage for supplying the material for thermal spraying, and a high pressure room for increasing the flying speed of heated material for thermal spraying.

A thermal spraying apparatus comprising: (1) a gun having a passage for supplying the material for thermal spraying, and a high pressure room for increasing the flying speed of heated material for thermal spraying; (2) an evaporating substance feeding means for feeding evaporating substance to a beam irradiation portion; and (3) a heating means for discharging a high density energy beam (laser beam) to the evaporating substance supplied to the beam irradiation portion in the high pressure room for evaporating the evaporating substance in a short time.

A gun for thermal spraying comprising: a passage for supplying the material for thermal spraying; a heating means for heating the material for thermal spraying; and a high pressure room for increasing the flying speed of heated material for thermal spraying.

A gun for thermal spraying comprising: a passage for supplying the material for thermal spraying, an induction heating means for induction-heating the material for thermal spraying in the passage or discharged from the passage.

A gun for thermal spraying comprising: a passage for supplying the material for thermal spraying, an induction coil for induction-heating the material for thermal spraying in the passage or discharged from the passage.

A powder passage apparatus for supplying powder, comprising: a conductive coil having conductivity, and having an axis and a plurality of loops disposed coaxially with respect to the axis; a passage-forming member disposed along the axis of the conductive coil and in the conductive coil for supplying material for thermal spraying; and wherein the conductive coil generates magnetic force along the central axis line of the passage, thereby the powder material for thermal spraying having permeability flows along the center portion in a radial direction of the passage.

What is claimed is:

1. A thermal spraying method for producing a thermal sprayed layer by heating material for thermal spraying, by flying the heated material or the heating material to a surface of an object, and by piling the heated material on the surface of the object, comprising the steps of:

preparing a speed-increasing means for adding energy to the heated material or the heating material to increase a flying speed of the material; and adding energy to the heated material or the heating material by the speed-increasing means in such a manner that a flying speed of the heated material or the heating material increases until the material reaches the surface of the object; wherein:

the heating of the material is carried out by a first energy source capable of heating the material for thermal spraying, and the adding of the energy for increasing the flying speed of the material is carried out by a second energy source constituting the speed-increasing means for adding energy to the heated material or the heating material, the second energy source being controlled independently of the first energy source, the first energy source for heating the material is constituted by an induction heating apparatus for heating the material for thermal spraying by means of induction heating based on alternating current having a high frequency, and the speed-increasing means increases and accelerates the fixing speed of material by a gas stream having a high speed, and the gas stream is formed of at least one selected from the group consisting of helium gas, nitrogen gas, air gas, oxygen gas, and hydrogen gas;

wherein the speed-increasing means includes; a gun having a high pressure room; a gas-storing division for storing gas; a compressor connected with the gas-storing division for compressing the gas supplied from the gas-storing division; and a pressure amplifier connected with the compressor for amplifying the pressure of the gas compressed by the compressor, and wherein the amplified pressure is supplied to the high pressure room for obtaining the high pressure in the high pressure room to increase, the flying speed of the material.

2. The thermal spraying method according to claim 1, wherein the adding of the energy for increasing the flying speed of the material is carried out after the heating of the material for thermal spraying.

3. The thermal spraying method according to claim 1, wherein the adding of the energy for increasing the flying speed of the material is carried out during the heating of the material for thermal spraying.

4. The thermal spraying method according to claim wherein the first energy source and the second energy source are capable of being controlled independently and individually to adjust the heating of the material and the increasing of the flying speed of the material.

5. The thermal spraying method according to claim 1, wherein the gas stored in the gas-storing division for storing gas is at least one selected from the group consisting of helium gas, nitrogen gas, air gas, oxygen gas, and hydrogen gas.

6. The thermal spraying method according to claim 1, wherein the material for thermal spraying has conductivity and magnetic permeability.

7. The thermal spraying method according to claim 1, wherein the frequency of alternating current is set to be in a range from 5 kHz to 100 MHz.

8. The thermal spraying method according to claim 1, wherein the flying speed of the material is accelerated by the speed-increasing means, and wherein the flying speed of the material before acceleration is lower than that of the material after the acceleration for lengthening the time for heating the material for thermal spraying to a target temperature range, thereby ensuring ability for heating the material for thermal spraying.

9. The thermal spraying method according to claim 1, wherein the speed-increasing means increases the flying speed of the material by using a swelling gas pressure caused by expanding gas or by evaporating liquid.

10. The thermal spraying method according to claim 1, wherein the material for thermal spraying has a powder particle shape whose diameter falls in a range from 1 to 500 $\mu$m.

11. The thermal spraying method according to claim 1, wherein the material for thermal spraying is formed of at least one selected from the group consisting of as cast iron, carbon steel, stainless steel, alloy steel, aluminum, aluminum alloy, copper, copper alloy, nickel, nickel alloy, titanium, titanium alloy, ceramics, and cermet.

* * * * *